United States Patent Office 2,808,125
Patented Oct. 1, 1957

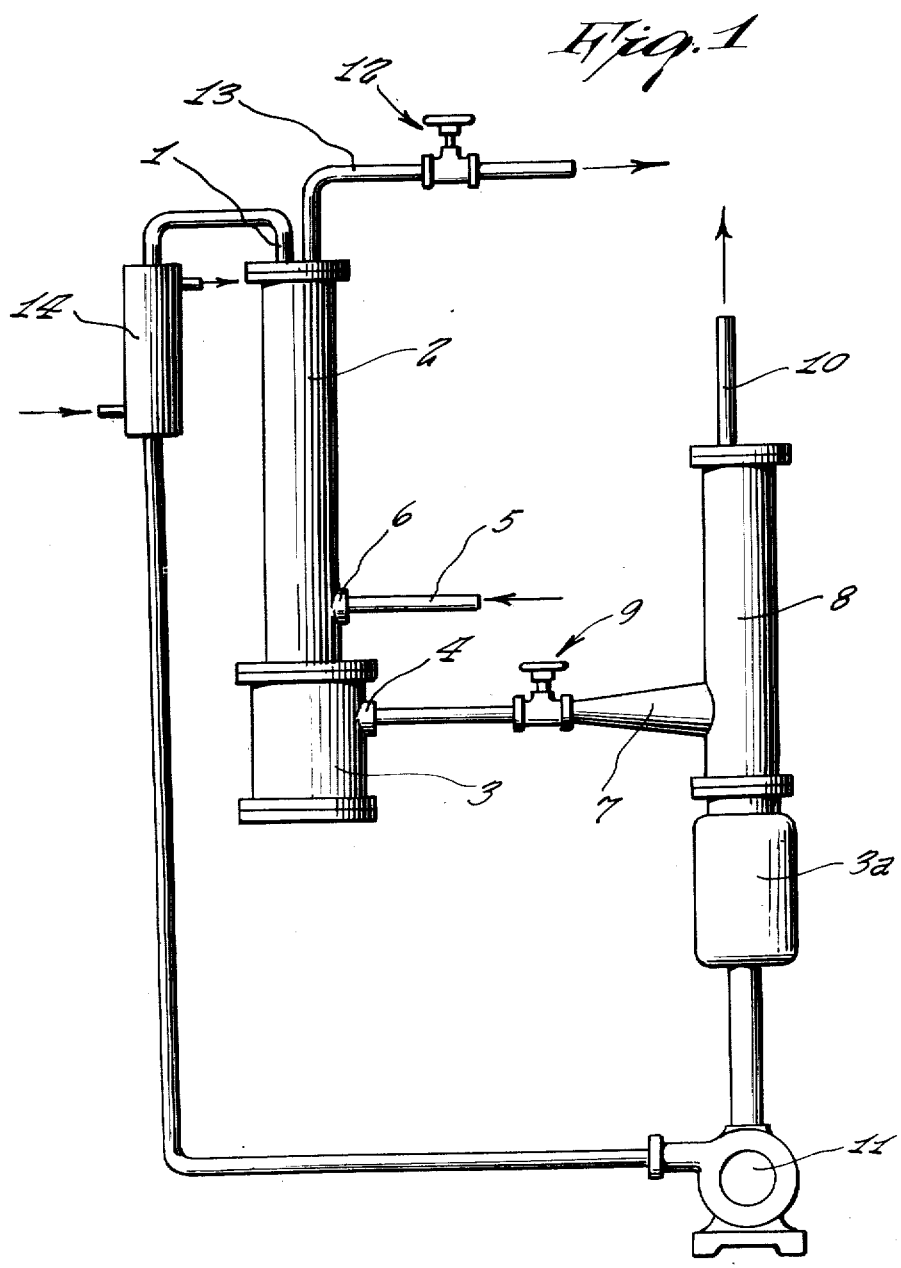

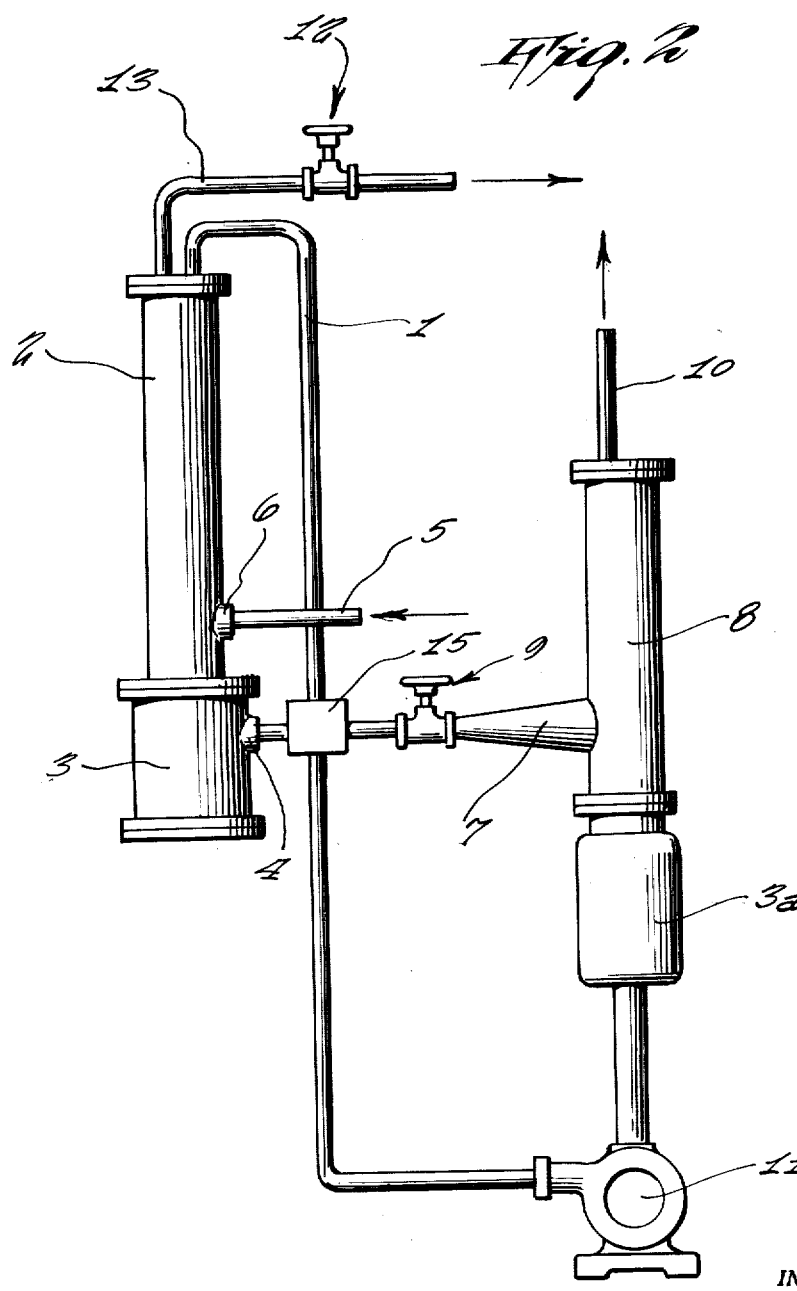

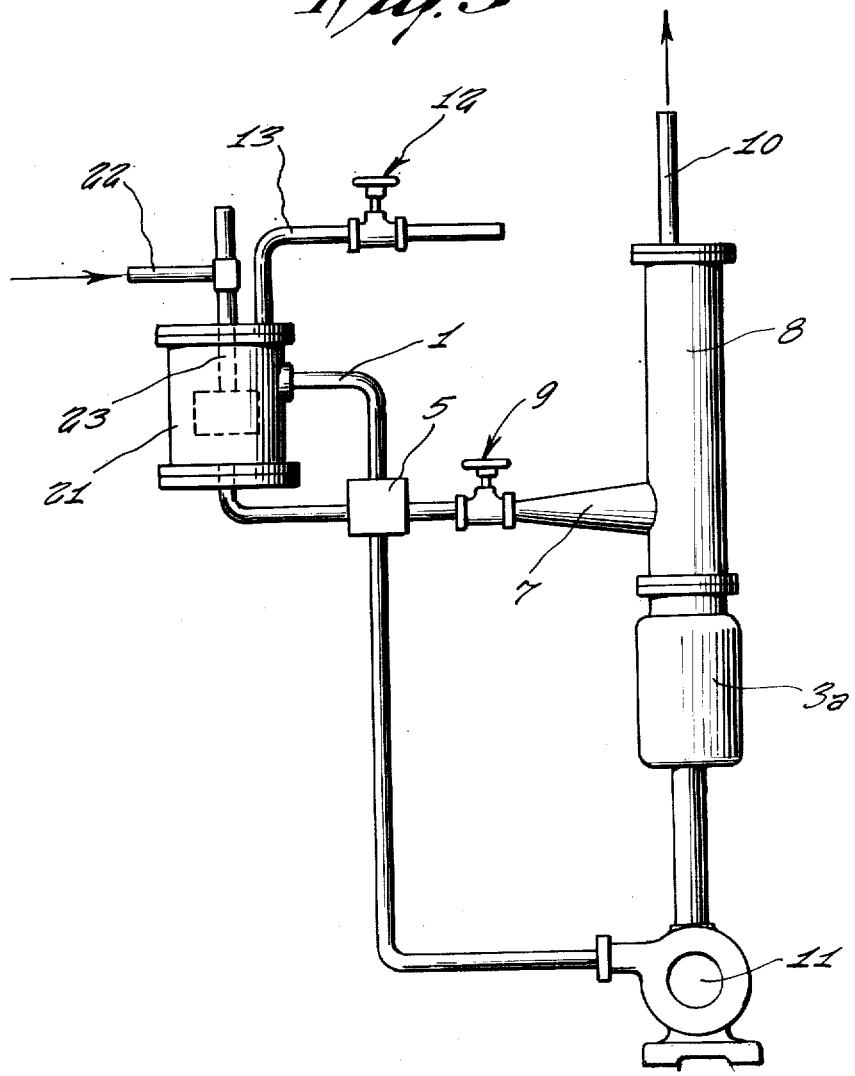

2,808,125

PROCESS FOR THE SEPARATION OF CARBON DIOXIDE AND AMMONIA

Alfred Buck, Ems, and Charles Cramer, Vaduz, Switzerland, assignors to Inventa A. G. für Forschung und Patentverwertung, Zurich, Switzerland Application November 17, 1955, Serial No. 547,509

8 Claims. (Cl. 183—115)

The present invention relates to a process for the separation of carbon dioxide and ammonia. This is a continuation-in-part of Serial No. 366,244, filed July 6, 1953, now abandoned.

It is known to produce urea by heating $CO_2$ and $NH_3$ or ammonium carbamate under pressure in a closed system. In this process, the formation of urea is not complete. Many attempts have been made to improve the yield of urea, but there has as yet not been found a satisfactory solution to the problem of making the two reactions I      $2NH_3 + CO_2 \rightarrow NH_4OOC\text{—}NH_2$ II     $NH_4OOC\text{—}NH_2 \rightarrow NH_2\text{—}CO\text{—}NH_2 + H_2O$ occur as desired.

The utilization of the non-converted material is an important factor in the production costs of urea. One possibility of using the said gas mixture obtained in the process (consisting of ammonia and carbon dioxide) is to produce therefrom ammonium sulfate, ammonium nitrate, or fertilizer containing ammonia. A disadvantage of this method is the combination of a urea plant with other auxiliary plants whereby the risk of operational disturbances is increased.

Recently, endeavors are being made to separate the non-converted gases from urea obtained in the process, in order to convert them in a recycling operation, together with fresh gases, into a further amount of urea. Thus, carbon dioxide and ammonia recovered from the decomposition of carbamate may be re-introduced together into the urea synthesis.

The latter process has considerable drawbacks due to the fact that, upon compression of a mixture of carbon dioxide and ammonia, solid compounds such as ammonium carbamate and carbonate are formed which, as well as urea and its decomposition products, tend to clog nozzles and pipes, which may lead to damage of the compressor.

Another known process suggests to avoid compression, by heating the aqueous solution and liberating the gases therefrom, whereafter they are introduced into the urea autoclave under pressure. This, however, causes large amounts of water to enter the reaction chamber, thus reducing the throughput to a considerable extent. While compressor work is saved in this method, larger amounts of heat are needed in order to drive off the gases from the solution with sufficient pressure.

According to yet another method, the non-converted gases can be removed from the synthesis mixture by fractional distillization one by one. The gases may be conveyed to the autoclave singly, if desired compressed, by means of pumps. This method of separation is, however, so incomplete that again carbamate may be formed and deposited in parts of the apparatus, pipes, etc., thereby incurring the above mentioned inconveniences.

A process for using the gases on an industrial large scale mainly consists in a combination of the known methods. The unconverted ammonium carbamate and ammonia present in large excess are withdrawn from the autoclave and subjected to a number of distillations. In this way it is possible to obtain the major part of the excess ammonia in such a pure state that it can be re-liquified and returned to the autoclave. The residual gases consisting of ammonia, carbon dioxide and water, are recovered as highly concentrated aqueous solution and are separately pumped into the autoclave in this form. While the return of water obtained in the synthesis reaction impairs the output, this is partly compensated for by the large ammonia excess. The high installation costs as well as the maintenance expenses are a disadvantage in this process because there is considerable corrosion of apparatus parts due to the returned aqueous solution of ammonia and carbon dioxide. In order to keep corrosion down, it is necessary to plate the apparatus with silver.

Processes are also known in which only one component is recovered and returned to the synthesis. In the case where $CO_2$ is the one component, it is reacted with alkali hydroxides under formation of carbonates; where $NH_3$ is concerned, it is converted to ammonium nitrate by reaction with nitric acid, or ammonium sulfate with sulfuric acid.

It is further known that the gases can be treated with a selective solvent, for instance with the solution of an ammonium salt or urea salt of a strong acid. For instance, with a 60% ammonium nitrate solution at 90° C., solutions may be obtained which contain 40 grams ammonia and 2.5 grams $CO_2$ per liter. From the absorption column, a gas consisting of $CO_2$ escapes in this process having a very low content in $NH_3$.

According to another suggestion, water is used as selective absorption means. However, if absorption of $NH_3$ in the presence of $CO_2$ occurs in water under pressure, there will be a larger percentage of $NH_3$ than of $CO_2$ dissolved, as compared to working without pressure; in other words, water absorbs under pressure $NH_3$ more selectively than under atmospheric pressure. This process has the inconvenience that the selective action of water as absorbent for ammonia is in presence of $CO_2$ comparatively small even under pressure, so that a separation on an industrial scale is very difficult to perform.

In an attempt to overcome the various inconveniences of processes hitherto in use, we devised a process for the separation of $CO_2$ and $NH_3$ by selective absorption of a liquid at elevated temperatures and under superatmospheric pressures.

It has been found quite unexpectedly that a mixture of ammonium nitrate and water is capable of dissolving, due to the higher pressure, larger amounts of gas than in the operation without pressure—temperatures being even—but that the selectivity of the solvent is no longer so marked than when working with pressureless absorption. For instance, 100 gr. ammonium nitrate in water of 90° C. with a pressure of 1 atm. absolute dissolve 12.0 grams $NH_3$ and 0.7 percent by weight of $CO_2$. This corresponds to a degree of purity of 94% of the dissolved $NH_3$, whereas at the same temperature with a pressure of 2 atm. absolute, 52 grams $NH_3$ and 3.1 grams $CO_2$ are dissolved, which only corresponds to a degree of purity of 91% for $NH_3$. The degree of purity of ammonia in a mixture with $CO_2$ is defined by the following formula:

$$\frac{a}{a+b}$$

in which $a$ stands for the dissolved amount of $NH_3$ in 1 liter solvent divided by the molecular weight of $NH_3$, and $b$ stands for the dissolved amount of $CO_2$ divided by the molecular weight of $CO_2$.

In this absorption process, namely in the separation of $NH_3$ and $CO_2$ from mixtures, salts are partly formed from ammonia and carbon dioxide with addition of water, such salt formation also occurring with the ammonium nitrate contained in the absorbent.

Therefore, the absorbent solution is a solution in which several compounds exist in equilibrium with each other, so that the ratio of ammonia: carbon dioxide in solution can be influenced to a large extent by variation of pressure and temperature.

It has now been found that the gas mixture of ammonia and carbon dioxide can be separated into the components with a minimum amount of energy, while working with ammonium nitrate solutions as absorbent at increased pressure and temperature in a continuous process, if the entire energy necessary for the selective absorption and for the desorption is added in the form of heat and pressure in the absorption column.

As a consequence, in carrying out the process according to the invention, two conditions have to be fulfilled:

I. A sequence of operations has to be set up causing the separation; and

II. The energy input has to be maintained as low as possible.

Static experiments with $NH_4NO_3$ solutions and $NH_3$—$CO_2$ gases showed the following results:

(1) With increasing pressure and constant temperature maintained during the absorption, the solubility of the two components, $NH_3$ and $CO_2$ increases, the ratio $NH_3/CO_2$ decreases and vice versa.

(2) With increasing temperature and constant pressure maintained during the absorption, the solubility of both components decreases, the ratio of $NH_3/CO_2$ increases and vice versa.

It would be possible to work in countercurrent, i. e. admitting the fresh gas mixture in opposite direction to the circulating absorbent solution in a column containing a filler. In such a process the solution entering at the head of a column becomes richer in absorbed $NH_3$ as it approaches the bottom. The rich solution is then fed to a desorption column, whereby imput of energy dissolved gases are eliminated from the solution. The weak solution is then recycled to the head of the absorption column.

This mode of operation is not entirely satisfactory with respect to the heat consumed.

When it is desired to eliminate the maximum amount of $CO_2$ from the $NH_3$, care has to be taken that in the direction from the absorption to the desorption column as much $NH_3$ and as little $CO_2$ be carried as possible.

This involves applying high pressure in the absorption operation in order to dissolve a large amount of $NH_3$; on the other hand, high temperature has to be used in order to absorb as little $CO_2$ as possible. The heat or pressure preferably applied in the absorption column depends on various factors. As explained above the degree of purity of the separated gases depends on the pressure used in the selective absorption of ammonia from a mixture of ammonia, carbondioxide and water. But the pressure cannot be chosen with only the purity of the separated gases in mind. As known to people skilled in the art, the mixture of ammonia, carbondioxide and water is taken from the urea-converter by decomposing the unconverted ammoniumcarbamate in the effluents. It is clear that the decomposition of said ammoniumcarbamate to ammonia, carbondioxide and water has to be carried out at the same pressure as the following separation by selective absorption. It is also clear that by this decomposition of ammoniumcarbamate under pressure a part of the ammonia-carbondioxide-water mixture corresponding to the pressure is kept dissolved in the remaining urea-water mixture. This part of ammonia and carbondioxide escapes by passing said urea-water mixture in a normally following concentration vessel, where the releasing of dry urea takes place under atmospheric pressure.

This part of unconverted ammonia and carbondioxide is also available only at atmospheric pressure and it is therefore impossible to separate the free gases by absorption under pressure. The level of pressure applied in the absorption according to our invention depends therefore also on the amount of the mixture of ammonia and carbondioxide only available at atmospheric pressure, which can be used e. g. according to known processes for the production of various nitrogen fertilizers.

The pressure preferably applied is normally 1–20 atmospheres.

In the desorption step, however, pressure and temperature have to be as low as possible in order to recycle only a small amount of $NH_3$ and a high amount of $CO_2$ into the desorption column.

For best technical results the energy imput should be as low as possible, while at the same time permitting an effective separation of the waste gases from the urea production.

It has been determined by tests that:

1. Systems working without pressure require a considerable expense of energy for the separation of the gases, particularly during desorption;

2. Systems operating with pressure in the absorption period to which heat has to be supplied during desorption, as under (1) above, are not very useful for the same reason;

3. In the case where heat has to be supplied for the separation of the gases under pressure, it should be supplied somewhere in the absorption process;

4. Input of heat after expansion is harmful; a cooling is, in some cases, desirable at this stage.

5. Energy consumption can be decreased considerably or with equal energy consumption the effect of separation can be considerably increased, by inserting a heat exchanger between absorption column (sump) and relief valve on the one hand, and sump-desorption head-absorption on the other hand.

In the accompanying drawings, an apparatus for carrying out the process of the invention is illustrated in several embodiments.

In the drawings:

Fig. 1 illustrates one embodiment of an absorption-desorption apparatus to be used according to the invention in diagrammatic showing.

Fig. 2 diagrammatically illustrates a modified embodiment; and Fig. 3 yet another embodiment.

In Fig. 1, numeral 1 designates an admission pipe 1 at the top of an absorption column 2; pipe 1 is provided with a heater 14 for heating up the absorption solution; as a heating agent, steam may be used, if necessary, superheated steam.

At the bottom of the absorption column 2, there is a sump 3, which is connected over a pipe 4 to an expansion valve 9 and a conduit 7 leading to a desorption column 8 provided with an escape pipe 10, and a sump 3a at the bottom. Between the desorption and the absorption system a pump 11 is arranged.

Near the bottom of absorption column 2 a pipe 5 is provided with an inlet 6, and at the head of the absorption column, another pipe 13 with an expansion valve 12 serving for the escape of gas.

*Example 1*

This example proves that the heat consumed for a separating process as described under (2), column 3, line 33, compared with the other examples, is very high, although $CO_2$ and $NH_3$ of good purity are obtained.

The operation is carried out in the device illustrated in Fig. 1 as follows:

An absorption solution heated in 14 is admitted through pipe 1 into the absorption column. The absorption solution is ammonium nitrate of 43% which is admitted through pipe 1 at a temperature of 140° C. and at a pressure of 9.75 atm. absolute.

An amount of $CO_2$, which has not been absorbed, escapes by way of pipe 13 and valve 12.

Heat supplied to the solution in the heater 14 amounts to about 7% of the total heat required in the absorption-desorption system. The balance of 93% is supplied to the $NH_3$-containing solution by heating the same in the absorption column 2.

While ammonium nitrate solution enters the absorption column 2 at the head, the gas mixture to be separated is simultaneously admitted through pipe 5. The mixture contains 46 vol. percent $NH_3$, 47% $CO_2$, and 7% water. The ammonium nitrate solution in the absorption column is charged with $NH_3$ entering through pipe 5, whereas pure $CO_2$ escapes through the valve 12. The ammonium nitrate solution charged with $NH_3$ is collected at the bottom of column 2 (sump), pressure being reduced in line 4 by valve 9 so that the ammonium nitrate solution will reach the desorption column 8 with a pressure of 1.5 atm. absolute. By heating column 8, $NH_3$ is separated from the solution and escapes through tube 10 whereas the absorption solution is recycled by means of pump 11 into pipe 1 of the absorption system.

Throughput: 10.9 g./l. $CO_2$ (in circulation); 72 g./l. $NH_3$
Purity of $NH_3$=94.5 vol./percent
Purity of $CO_2$=99 vol./percent
Heat consumed: About 2000 kcal./kg. $NH_3$ (without counting loss by radiation)
Temperature in the sump of adsorption column=110° C.

*Example 2*

The same apparatus is used as in Example 1. The operation is carried out in the same manner as described in Example 1 except for the following differences:

The pressure in the absorption column is 9 atm. absolute, the temperature in the sump of the absorption column is 137° C. All heat used in the whole absorption-desorption process is supplied by heating the bottom (sump) of the absorption column by means of a reboiler. The desorption takes place by reducing the pressure of the absorption solution charged with $NH_3$ to a pressure of 1.08 atm. absolute. The temperature in the sump of the desorption column is 85° C. The throughput of $NH_3$ amounts to 40 g./l. of the circulated solution. Amount of $CO_2$ traveling through the system is 6.3 g./l. of circulating solution.

Purity of $NH_3$=94.5 vol./percent
Purity of $CO_2$=99.2 vol./percent
Heat consumed: 350 kcal. per g. $NH_3$
Concentration of $NH_4NO_3$-solution=about 44% by weight In Fig. 2, a modified embodiment of the apparatus shown in Fig. 1 is illustrated, where identical parts are designated by the same numerals. The difference between the apparatuses relates to the heating device for the ammonium nitrate solution entering through pipe 1. Instead of a heater 14, as shown in Fig. 1, a heat exchanger 15 is built into pipes 4 and 1. In this arrangement, the solution passing from the sump 3 of the absorption column is cooled on its way to the desorption column 8, while at the same time heat is supplied to the absorption solution recycled by pump 11 to pipe 1.

In Fig. 3, yet another modification of the apparatus is illustrated, in which the desorption-part of the system is the same as in Figs. 1 and 2 and a heat exchanger 15 is provided as in Fig. 2. However, the absorption-part of the system is different.

A simple pressure vessel 21 is used as absorption vessel which is provided with a vigorous stirrer 22. In order to obtain rapid distribution of the gas admitted, the admission is directly effected by means of the hollow shaft 23 of the stirrer 22. In using this modified apparatus, saturation of the absorption solution with ammonia can be carried out in a very short time, for instance in 30 seconds.

*Example 3*

The operation is carried out in the apparatus shown in Fig. 2. The pressure in the absorption column 2 is 11 atm. absolute, the temperature in the sump 3 of the column 2, 152° C. The entire heat required is admitted by means of the heat exchanger 15 and by a reboiler (not drawn) on the bottom of the absorption column. The pressure in the desorption column is 1.08 atm. absolute, the temperature in the sump of the desorption column is 80° C. The entire amount of ammonia per liter circulating solution is 30 g. $NH_3$, the carbon dioxide 2.5 g./l.

Purity of ammonia=97 vol./percent
Purity of $CO_2$=about 98 vol./percent
Heat consumed=350 kcal./kg. $NH_3$ (not counting loss by radiation)
Concentration of ammonium nitrate solution=45% by weight

*Example 4*

The operation is carried out in the apparatus according to Fig. 3. Pressure in the absorption vessel is 11 atm. absolute, the temperature 145° C. Heat is again admitted in the absorption-part of the system, by heat exchanger 15, which simultaneously cools the ammonia-containing solution passed into the desorption column 8. The pressure in the desorption column is 1.08 atm. absolute, the temperature in the sump of the desorption column 80° C. Amount of ammonia traveling per liter circulating solution is 30 g. $NH_3$, amount of $CO_2$ per liter solution 2.5 g. Since in this absorption system the time of stay in the absorption vessel is only about 30 seconds, the purity of the ammonia is increased to about 99 vol./percent, as compared to 97 vol./percent in Example 3.

What we claim is:

1. A process for the separation of gas mixtures containing ammonia and carbon dioxide by applying an aqueous ammonium nitrate solution under superpressure and raised temperature, as selective absorbent of said gases, which comprises passing through an absorption system in counter-current to said gas mixture, under a superpressure ranging from about 9 to 11 atmospheres, of an aqueous ammonium nitrate solution containing about 45–60% by weight of ammonium nitrate, said solution being of a temperature ranging from 137° to 152° C., recovering carbon dioxide which escapes from said absorbent solution by free passage therethrough, passing the absorption solution charged with ammonia, after reducing the pressure thereof, into a desorption system, releasing the escaping ammonia and recycling the absorption solution free of ammonia into the absorption system, said process being carried out by supplying substantially the entire energy necessary for the whole absorption-desorption process in the absorption system.

2. A process according to claim 1, which comprises supplying substantially the entire energy necessary for the whole absorption-desorption process by heating the absorption solution partially prior to the absorption and partially during the absorption.

3. A process according to claim 1, wherein the solution containing absorbed ammonia is cooled before entering the desorption zone.

4. A process according to claim 3, wherein the cooling of the solution occurs by heat exchange with simultaneous heating of the absorbent solution prior to its admission to the absorption system.

5. A process according to claim 4, wherein the heating of the absorption solution prior to the absorption occurs by heat-exchange with simultaneous cooling of the absorption solution charged with ammonia.

6. A process according to claim 4, wherein the absorbent solution containing ammonia is additionally cooled in the desorbent system.

7. A process according to claim 1, wherein the process is carried out in continuous operation.

8. A process according to claim 1, wherein the time of stay of the gas mixture, referred to the unabsorbed $CO_2$, in the absorption system ranges from 10 seconds to 3 minutes.

References Cited in the file of this patent

UNITED STATES PATENTS

| | | |
|---|---|---|
| 2,540,905 | Neubauer et al. | Feb. 6, 1951 |
| 2,634,826 | Cramer | Apr. 14, 1953 |
| 2,727,587 | Karwat | Dec. 20, 1955 |

OTHER REFERENCES

Dictionary of Chemical Solubilities by Comey and Hahn, pages 21 and 165.

Chemical Engineer's Handbook by John H. Perry, 2nd edition, McGraw-Hill Book Co., pages 1138–1195, particularly pages 1172–1175.

U. S. DEPARTMENT OF COMMERCE
PATENT OFFICE

CERTIFICATE OF CORRECTION

Patent No. 2,808,125                              October 1, 1957

Alfred Buck et al.

It is hereby certified that error appears in the printed specification of the above numbered patent requiring correction and that the said Letters Patent should read as corrected below.

Column 5, line 9, for "absorption column 2" read --desorption column 8--.

Signed and sealed this 8th day of April 1958.

(SEAL)
Attest:

KARL H. AXLINE

Attesting Officer

ROBERT C. WATSON
                                                               Commissioner of Patents